US010189963B2

(12) United States Patent
Burdeniuc et al.

(10) Patent No.: US 10,189,963 B2
(45) Date of Patent: *Jan. 29, 2019

(54) ADDITIVES FOR IMPROVING POLYURETHANE FOAM PERFORMANCE

(71) Applicant: EVONIK DEGUSSA GMBH, Essen (DE)

(72) Inventors: Juan Jesus Burdeniuc, Colmar, PA (US); James Douglas Tobias, Center Valley, PA (US); Renee Jo Keller, Orwigsburg, PA (US); You-Moon Jeon, Breinigsville, PA (US)

(73) Assignee: Evonik Degussa GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,054

(22) Filed: Sep. 11, 2015

(65) Prior Publication Data

US 2016/0002425 A1 Jan. 7, 2016

Related U.S. Application Data

(63) Continuation of application No. 13/178,558, filed on Jul. 8, 2011.

(60) Provisional application No. 61/362,964, filed on Jul. 9, 2010.

(51) Int. Cl.
| | |
|---|---|
| *C08J 9/04* | (2006.01) |
| *C08J 9/00* | (2006.01) |
| *C08G 18/18* | (2006.01) |
| *C08G 18/32* | (2006.01) |
| *C08G 18/38* | (2006.01) |
| *C08G 18/48* | (2006.01) |
| *C08G 18/66* | (2006.01) |
| *C08G 18/67* | (2006.01) |
| *C08K 5/31* | (2006.01) |
| *C08G 101/00* | (2006.01) |

(52) U.S. Cl.
CPC ........ *C08J 9/0042* (2013.01); *C08G 18/1825* (2013.01); *C08G 18/1875* (2013.01); *C08G 18/325* (2013.01); *C08G 18/3268* (2013.01); *C08G 18/3838* (2013.01); *C08G 18/4841* (2013.01); *C08G 18/6688* (2013.01); *C08G 18/678* (2013.01); *C08K 5/31* (2013.01); *C08G 2101/00* (2013.01); *C08G 2101/005* (2013.01); *C08G 2101/0008* (2013.01); *C08G 2101/0083* (2013.01); *C08G 2290/00* (2013.01); *C08J 2375/08* (2013.01)

(58) Field of Classification Search
CPC ............. C08G 18/3838; C08G 18/325; C08G 18/6688; C08G 18/678; C08G 18/3268; C08G 18/1875; C08G 18/1825; C08G 18/4841; C08G 2101/0083; C08G 2101/0008; C08G 2101/00; C08G 2290/00; C08G 2101/005; C08J 9/0042; C08J 2375/08; C08K 5/31; C08L 75/04
See application file for complete search history.

(56) References Cited

U.S. PATENT DOCUMENTS

| | | | | |
|---|---|---|---|---|
| 3,399,151 | A | * | 8/1968 | Kaiser ................ C08G 18/5063 521/166 |
| 3,462,381 | A | | 8/1969 | Eaton et al. |
| 3,734,868 | A | * | 5/1973 | Uelzmann .............. C08G 18/18 521/115 |
| 3,931,064 | A | | 1/1976 | Ray et al. |
| 4,191,815 | A | * | 3/1980 | Jourquin ............... A61L 15/425 428/318.8 |
| 4,258,141 | A | * | 3/1981 | Jarre .................. C08G 18/3838 521/114 |
| 4,380,593 | A | | 4/1983 | von Bonin et al. |
| 4,390,640 | A | | 6/1983 | Rasshofer et al. |
| 4,394,491 | A | | 7/1983 | Hoffman |
| 4,774,268 | A | | 9/1988 | Marx et al. |
| 4,895,878 | A | * | 1/1990 | Jourquin ............ C08G 18/3829 521/103 |
| 5,384,385 | A | | 1/1995 | Trinks et al. |
| 5,416,130 | A | | 5/1995 | Liman et al. |
| 5,786,402 | A | * | 7/1998 | Bruchmann ....... C08G 18/1825 521/129 |
| 6,387,972 | B1 | | 5/2002 | Ghobary et al. |
| 6,432,864 | B1 | | 8/2002 | Wendel et al. |
| 6,750,265 | B2 | | 6/2004 | Pauls et al. |
| 6,765,035 | B2 | | 7/2004 | Eling et al. |
| 6,849,667 | B2 | | 2/2005 | Haseyama et al. |
| 7,326,738 | B2 | * | 2/2008 | Stearns .................. C08G 18/10 521/131 |
| 8,076,385 | B2 | | 12/2011 | Ohama |
| 2002/0020827 | A1 | * | 2/2002 | Munzenberger ... C08G 18/4018 252/3 |
| 2004/0082712 | A1 | | 4/2004 | Blount |
| 2004/0242910 | A1 | | 12/2004 | Dwan ' Isa et al. |

(Continued)

FOREIGN PATENT DOCUMENTS

| | | |
|---|---|---|
| DE | 195 45 165 A1 | 6/1997 |
| EP | 0 307 987 A2 | 3/1989 |

(Continued)

*Primary Examiner* — John M Cooney
(74) *Attorney, Agent, or Firm* — Andrew H. Chung; Linda S. Li; Jason S. Ngui

(57) ABSTRACT

Polyurethane foam compositions and processes to make flexible polyurethane foams are disclosed. Polyurethane foam is produced in the presence of additives comprising guanidine derivatives. Improvements in physical properties such as air flow, dimensional stability, tensile, tear, elongation and foam hardness is observed when these additives are present in polyurethane formulations. In addition, these additives can minimize polymer degradation under humid ageing conditions resulting in foam products with better mechanical properties.

16 Claims, No Drawings

(56) References Cited

U.S. PATENT DOCUMENTS

| | | | |
|---|---|---|---|
| 2005/0282921 A1 | 12/2005 | Flanigan et al. | |
| 2006/0229375 A1 | 10/2006 | Hsiao et al. | |
| 2007/0197672 A1 | 8/2007 | Lekovie et al. | |
| 2007/0259982 A1* | 11/2007 | Burdeniuc | C08G 18/092 521/125 |
| 2008/0293841 A1* | 11/2008 | Andrew | C08G 18/161 521/157 |
| 2010/0216905 A1 | 8/2010 | Kuwamura et al. | |
| 2012/0071576 A1 | 3/2012 | Burdeniuc et al. | |

FOREIGN PATENT DOCUMENTS

| | | |
|---|---|---|
| GB | 1 420 293 A | 1/1976 |
| JP | 52128997 | 10/1977 |
| JP | 59197416 | 11/1984 |
| JP | 01158023 | 6/1989 |
| JP | 01287166 | 11/1989 |
| WO | 01/58976 A1 | 8/2001 |
| WO | 01/70842 A2 | 9/2001 |
| WO | 03/016372 A1 | 2/2003 |
| WO | 03/016373 A1 | 2/2003 |
| WO | 03/055930 A1 | 7/2003 |
| WO | 2004/060956 A1 | 7/2004 |
| WO | 2006/116456 A1 | 11/2006 |
| WO | 2007127379 A1 | 11/2007 |
| WO | 2009/051114 A1 | 4/2009 |

* cited by examiner

ADDITIVES FOR IMPROVING POLYURETHANE FOAM PERFORMANCE

CROSS-REFERENCE TO RELATED APPLICATIONS

This Application is a continuation of U.S. application Ser. No. 13/178,558, filed on Jul. 8, 2011. This Application also claims the benefit of U.S. Provisional Application No. 61/362,964, filed on Jul. 9, 2010. The disclosure of Application No. 61/362,964 is hereby incorporated by reference.

BACKGROUND OF THE INVENTION

The subject matter of the instant invention relates to polyurethane foam formulations and methods for making polyurethane foams.

The development of additives that can improve physical properties of polyurethane foam is of great interests because these additives can enable the use of more environmentally friendly components necessary to make polyurethane foam without sacrificing the mechanic performance of the finished product. Polyurethane foam is produced by reaction of polyisocyanate with polyol in the presence of a catalyst, typically tertiary amine. Unfortunately, tertiary amine catalysts can be malodorous and may have high volatility due to their low molecular weight. To overcome this problem, polyurethane manufacturers have sought to achieve amine emission-free products by using non fugitive tertiary amine catalysts. The retention of a tertiary amine in polyurethane foam can be due to the low volatility of the amine or more typically the tertiary amine would become part of the polyurethane polymer if the tertiary amine contains an isocyanate reactive group. Whether the low volatility is due to the intrinsic property of the amine or because of its incorporation in the polyurethane polymer, the presence of these tertiary amines in the finished product may cause the polyurethane polymer to undergo degradation when exposed to heat and humidity.

U.S. Pat. No. 4,258,141 discloses a process for the manufacture of flexible polyurethane foam with cyanic acid derivatives. The invention relates to a process to make flame resistant flexible polyurethane foams by reacting a mixture of diphenylmethane diisocyanates and polyphenylene polymethylene polyisocyanates having a functionality greater than 2 containing 40 to 90 percent by weight diphenylmethane diisocyanate based on the total weight of said mixture; polyol, cyanic acid derivatives such as cyanamide, dicyanamide, guanidine, biguanidine, melamine, cyanuric alkyl esterhydrazides and amides as flame inhibitors, and blowing agents, as well as, possibly, chain extenders and other additives. The cyanic acid derivatives are added to the foamable polyurethane mixture in quantities of 10 to 70% by weight, preferably 20 to 50% by weight, based on the weight of the mixture of isocyanates. These high levels of cyanic acid derivative are added to the reactive mixture as suspensions and are necessary to ensure flame resistance. Thus according to this invention at least 4.6 pphp of cyanoguanidine is needed in TDI based foam and at least 5.9 pphp of cyanoguanidine is needed in MDI foam. The poor solubility of cyanoguanidine in the reactive mixtures requires this material to be dispensed as a suspension rather than in solution.

U.S. Pat. No. 3,931,064 discloses an isocyanate based polymeric foam material having dispersed particulate low-softening point inorganic oxide glass having a transformation temperature of not greater than 300° C. and optionally a blowing agent which is capable of liberating a non-flammable gas on heating above a temperature in the range of 150 to 400° C. The invention relates to the incorporation of low softening point glass, particularly a phosphate glass, into an isocyanate-based foam and especially into a rigid isocyanate-based foam which confers a degree of fire retardance and may also give less smoke generation on combustion of the foam than the combustion of foams containing conventional fire-retardants additives.

US Pat. Application Pub No. 2007/0197672 A1 discloses foamable one part polyurethane compositions containing a high functionality quasi-prepolymer and a hydrated salt.

The previously identified patents and patent applications are hereby incorporated by reference.

BRIEF SUMMARY OF THE INVENTION

The instant invention solves problems associated with conventional foam formulations and methods by providing guanidine derivative containing additive composition and method for using the composition to produce flexible polyurethane foam. Examples of such compounds comprise at least one of guanidine, cyano guanidine, guanidine hydrochloride salt, guanidine phosphate salts, guanidine sulfate salts, 1-acetylguanidine, nitroguanidine, 1-(o-tolyl)-biguanidine, and mixtures thereof. A polyurethane formulation containing these additives can produce a foam product with better ambient physical properties as well as improved stability under accelerated humid ageing test.

In one aspect of the invention, these additives can improve the dimensional stability of the finished polyurethane product. For example, when flexible foams are produced in a heated mold it is necessary to crush the foam parts after being pulled out of the mold because they can lose their dimensional stability and shrink. Shrinkage is produced because flexible molded foam contains a relatively high percentage of closed cells and when the gas entrapped cools down the foam collapses due to the internal pressure loss. The process of the invention employs guanidine derivatives that can act as cell openers minimizing the loss of dimensional stability (shrinkage). The inventive composition and process provide the advantage that in the case of flexible foam produced in a heated mold no foam crushing may be required and in the case of free rise foams less foam shrinkage would occur. This results in scrap minimization and provides products with high quality (high dimensional stability). Also, the use of these additives would produce foam with superior physical properties both at ambient and after humid heat ageing.

In one aspect of the invention, the inventive additives improve physical properties at ambient conditions and also improve the stability of the polyurethane polymer when aged in the presence of hot humidity. In particular, ambient physical properties can become similar or very similar to fugitive catalysts when using a non-emissive catalyst/additive combination. Also, these additives can allow the usage of more environmentally friendly amine products that normally cannot match the performance of standard amine catalysts when used without the guanidine-derivative additives.

In another aspect of the invention, the additives (e.g., cyanoguanidine), are dissolved in order to produce the desired improvement in physical properties of polyurethane foam. In addition, the amount of guanidine derivative (e.g., cyanoguanidine), is used in an amount less than about 2.0 pphp in the foam pre-mix or foam precursor (e.g., less than about 2.0 pphp and typically less than about 2.5 PPHP).

In another aspect of the invention, the additives (e.g., guanidine derivatives) are used in a foam pre-mix or foam precursor wherein the amount of DICY that is less than about 1.0 PPHP DICY (e.g., in order to minimize foam collapse due to excessive cell opening).

DETAILED DESCRIPTION OF THE INVENTION

Preparation of Foams

Foams of any of the various types known in the art may be made using the methods of this invention, using typical polyurethane formulations to which have been added at least one guanidine derivative and the amine catalysts. The amount of guanidine derivative can vary but will typically range from about 0.01 pphp to about 2.0 pphp. For example, flexible polyurethane foams with excellent physical properties described herein will typically comprise the components shown below in Table 1, in the amounts indicated. The components shown in Table 1 will be discussed in detail below.

TABLE 1

Polyurethane Components

| Component | Parts by Weight |
|---|---|
| Base Polyol | 20-100 |
| Polymer polyol | 0-80 |
| Silicone surfactant | 0.5-10 |
| Blowing agent | 2-4.5 |
| Crosslinker | 0.5-2 |
| Catalyst | 0.25-10 |
| Polyisocyanate | To provide NCO index = 70-115 |

The amount of polyisocyanate used in polyurethane formulations according to the invention is not limited, but it will typically be within those ranges known to those of skill in the art. An exemplary range is given in table 1, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

NCO index=[NCO/(OH+NH)]*100

Flexible foams typically use copolymer polyols as part of the overall polyol content in the foam composition, along with base polyols of about 4000-5000 weight average molecular weight and hydroxyl number of about 28-35. Base polyols and copolymer polyols will be described in detail later herein.

Catalysts

The catalysts of the present invention comprise tertiary amines. Tertiary amine catalysts can contain an isocyanate-reactive group or not. Isocyanate reactive groups comprise primary amine, secondary amine, hydroxyl group, amide or urea. Tertiary amine catalysts containing isocyanate reactive groups include both gelling and blowing catalysts. Exemplary gelling catalysts include N,N-bis(3-dimethylamino-propyl)-N-isopropanolamine; N,N-dimethylaminoethyl-N'-methyl ethanolamine (DABCO® T, Air Products and Chemicals, Inc. of Allentown, Pa.); N,N,N'-trimethylamino-propyl ethanolamine (POLYCAT® 17, by Air Products and Chemicals, Inc.), N,N-dimethylethanolamine (DABCO® DMEA); N,N-dimethyl-N',N'-2-hydroxy(propyl)-1,3-propylenediamine; dimethylaminopropylamine (DMAPA); (N,N-dimethylaminoethoxy)ethanol, methyl-hydroxy-ethyl-piperazine, bis(N,N-dimethyl-3-aminopropyl)amine (POLYCAT® 15), N,N-dimethylaminopropyl urea (DABCO® NE1060, DABCO® NE1070), N,N'-bis(3-dimethylaminopropyl) urea (DABCO® NE1070, DABCO® NE1080), bis(dimethylamino)-2-propanol, N-(3-aminopropyl)imidazole, N-(2-hydroxypropyl)imidazole, and N-(2-hydroxyethyl)imidazole.

Exemplary blowing catalysts containing isocyanate reactive groups include 2-[N-(dimethylaminoethoxyethyl)-N-methylamino]ethanol (DABCO® NE200), dimethylaminoethoxyethanol and N,N,N'-trimethyl-N'-3-aminopropyl-bis(aminoethyl)ether (DABCO® NE300).

The catalyst may also comprise tertiary amines that are highly volatile and not isocyanate-reactive. Suitable volatile gelling catalysts may include, for example, diazabicyclooctane (triethylenediamine), supplied commercially as DABCO 33-LV® catalyst, tris(dimethylalminopropyl)amine (Polycat® 9), dimethylaminocyclohexylamine (Polycat® 8), 1,2-dimethylimidazole, 1-methylimidazole and bis(dimethylaminopropyl)-N-methylamine (Polycat® 77). Suitable volatile blowing catalysts include, for example, bis-dimethylaminoethyl ether, commercially supplied as DABCO® BL-11 catalyst by Air Products and Chemicals, Inc.; as well as pentamethyldiethylenetriamine (POLYCAT® 5, Air Products and Chemicals, Inc.), hexamethyltriethylenetetramine, heptamethyltetraethylenepentamine and related compositions; higher permethylated polyamines; 2-[N-(dimethylaminoethoxyethyl)-N-methylamino]ethanol and related structures; alkoxylated polyamines; imidazole-boron compositions; or amino propyl-bis(amino-ethyl)ether compositions. The catalyst compositions may also include other components, for example transition metal catalysts such as organotin compounds, salts of tin, organobismuth and bismuth salts, for example when the desired polyurethane foam is a flexible slab stock.

Typically, the loading of non-fugitive tertiary amine catalyst(s) for making foam according to the invention will be in the range of 0.1 to 20 pphp, more typically 0.1 to 10 pphp, and most typically 0.1 to 5 pphp. However, any effective amount may be used. The term "pphp" means parts per hundred parts polyol.

Organic Isocyanates

Suitable organic isocyanate compounds include, but are not limited to, hexamethylene diisocyanate (HDI), phenylene diisocyanate (PDI), toluene diisocyanate (TDI), and 4,4'-diphenylmethane diisocyanate (MDI). In one aspect of the invention, 2,4-TDI, 2,6-TDI, or any mixture thereof is used to produce polyurethane foams. Other suitable isocyanate compounds are diisocyanate mixtures known commercially as "crude MDI." One example is marketed by Dow Chemical Company under the name PAPI, and contains about 60% of 4,4'-diphenylmethane diisocyanate along with other isomeric and analogous higher polyisocyanates.

Polyol Component

Polyurethanes are produced by the reaction of organic isocyanates with the hydroxyl groups in a polyol, typically a mixture of polyols. The polyol component of the reaction mixture includes at least a main or "base" polyol. Base polyols suitable for use in the invention include, as non-limiting examples, polyether polyols. Polyether polyols include poly(alkylene oxide) polymers such as poly(ethylene oxide) and poly(propylene oxide) polymers and copolymers with terminal hydroxyl groups derived from polyhydric compounds, including diols and triols. Examples of diols and triols for reaction with the ethylene oxide or propylene oxide include ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, and similar low molecular weight polyols. Other base polyol examples known in the art include polyhydroxy-terminated acetal resins, hydroxyl-terminated amines and hydroxyl-terminated polyamines. Examples of these and other suitable isocyanate-reactive materials may be found in U.S. Pat. No. 4,394,491; hereby incorporated by reference. Suitable polyols also include those containing tertiary amine groups than can catalyze the gelling and the blowing reaction of polyurethanes, for example those described in WO 03/016373 A1, WO 01/58976 A1; WO2004/060956 A1; WO03/016372 A1; and WO03/055930 A; the foregoing incorporated by reference. Other useful polyols may include polyalkylene carbonate-based polyols and polyphosphate-based polyols.

In one aspect of the invention, a single high molecular weight polyether polyol may be used as the base polyol. Alternatively, a mixture of high molecular weight polyether polyols, for example, mixtures of di- and tri-functional materials and/or different molecular weight or different chemical composition materials may be used. Such di- and tri-functional materials include, but are not limited to polyethylene glycol, polypropylene glycol, glycerol-based polyether triols, trimethylolpropane-based polyether triols, and other similar compounds or mixtures. In some embodiments of the invention, at least 50 wt % polyol component consists of one or more polyether polyols.

In addition to the base polyols described above, or instead of them, materials commonly referred to as "copolymer polyols" may be included in a polyol component for use according to the invention. Copolymer polyols may be used in polyurethane foams to increase the resistance of the foam to deformation, for example to improve the load-bearing properties of the foam. Depending upon the load-bearing requirements for the polyurethane foam, copolymer polyols may comprise from 0 to about 80 percent by weight of the total polyol content. Examples of copolymer polyols include, but are not limited to, graft polyols and polyurea modified polyols, both of which are known in the art and are commercially available.

Graft polyols are prepared by copolymerizing vinyl monomers, typically styrene and acrylonitrile, in a starting polyol. The starting polyol is typically a glycerol-initiated triol, and is typically end-capped with ethylene oxide (approximately 80-85% primary hydroxyl groups). Some of the copolymer grafts to some of the starting polyol. The graft polyol also contains homopolymers of styrene and acrylonitrile and unaltered starting polyol. The styrene/acrylonitrile solids content of the graft polyol typically ranges from 5 wt % to 45 wt %, but any kind of graft polyol known in the art may be used.

Polyurea modified polyols are formed by the reaction of a diamine and a diisocyanate in the presence of a starting polyol, with the product containing polyurea dispersion. A variant of polyurea modified polyols, also suitable for use, are polyisocyanate poly addition (PIPA) polyols, which are formed by the in situ reaction of an isocyanate and an alkanolamine in a polyol.

Blowing Agents

Polyurethane foam production may be aided by the inclusion of a blowing agent to produce voids in the polyurethane matrix during polymerization. Any blowing agent known in the art may be used. Suitable blowing agents include compounds with low boiling points which are vaporized during the exothermic polymerization reaction. Such blowing agents are generally inert or they have low reactivity and therefore it is likely that they will not decompose or react during the polymerization reaction. Examples of blowing agents include, but are not limited to, carbon dioxide, chlorofluorocarbons (CFCs), hydrofluorocarbons (HFCs), hydrochlorofluorocarbons (HCFCs), fluoroolefins (FOs), chlorofluoroolefins (CFOs), hydrofluoroolefins (HFOs), hydrochlorfluoroolefins (HCFOs), acetone, and low-boiling hydrocarbons such as cyclopentane, isopentane, n-pentane, and their mixtures. Other suitable blowing agents include compounds, for example water, that react with isocyanate compounds to produce a gas. The amount of BA is typically from about 0 (water blown) to about 80 pphp. Water (blow foam by reacting with isocyanate making $CO_2$) can be present in the range from about 0 (if a BA is included) to about 60 pphp (a very low density foam) and typically from about 1.0 pphp to about 10 pphp and, in some cases, from about 2.0 pphp to about 5 pphp.

Other Optional Components

A variety of other ingredients may be included in the formulations for making foams according to the invention. Examples of optional components include, but are not limited to, cell stabilizers, crosslinking agents, chain extenders, pigments, fillers, flame retardants, auxiliary urethane gelling catalysts, auxiliary urethane blowing catalysts, transition metal catalysts, and combinations of any of these.

Cell stabilizers may include, for example, silicone surfactants or anionic surfactants. Examples of suitable silicone surfactants include, but are not limited to, polyalkylsiloxanes, polyoxyalkylene polyol-modified dimethylpolysiloxanes, alkylene glycol-modified dimethylpolysiloxanes, or any combination thereof. Suitable anionic surfactants include, but are not limited to, salts of fatty acids, salts of sulfuric acid esters, salts of phosphoric acid esters, salts of sulfonic acids, and combinations of any of these.

Crosslinking agents include, but are not limited to, low-molecular weight compounds containing at least two moieties selected from hydroxyl groups, primary amino groups, secondary amino groups, and other active hydrogen-containing groups which are reactive with an isocyanate group. Crosslinking agents include, for example, polyhydric alcohols (especially trihydric alcohols, such as glycerol and trimethylolpropane), polyamines, and combinations thereof. Non-limiting examples of polyamine crosslinking agents include diethyltoluenediamine, chlorodiaminobenzene, diethanolamine, diisopropanolamine, triethanolamine, tripropanolamine, 1,6-hexanediamine, and combinations thereof. Typical diamine crosslinking agents comprise twelve carbon atoms or fewer, more commonly seven or fewer.

Examples of chain extenders include, but are not limited to, compounds having hydroxyl or amino functional group, such as glycols, amines, diols, and water. Specific non-limiting examples of chain extenders include ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, or any mixture thereof.

Pigments may be used to color code the polyurethane foams during manufacture, for example to identify product grade or to conceal yellowing. Pigments may include any suitable organic or inorganic pigments known in the polyurethane art. For example, organic pigments or colorants include, but are not limited to, azo/diazo dyes, phthalocyanines, dioxazines, and carbon black. Examples of inorganic pigments include, but are not limited to, titanium dioxide, iron oxides, or chromium oxide.

Fillers may be used to increase the density and load bearing properties of polyurethane foams. Suitable fillers include, but are not limited to, barium sulfate or calcium carbonate.

Flame retardants may be used to reduce the flammability of polyurethane foams. For example, suitable flame retardants include, but are not limited to, chlorinated phosphate esters, chlorinated paraffins, or melamine powders.

The following Examples are provided to illustrate certain aspects of the instant invention and shall not be used to limit the scope of the claims attached hereto.

Examples 1 and 2

Examples 1 and 2 demonstrate making polyurethane foams by utilizing guanidine derivatives in the presence of tertiary amine catalysts (fugitive or non-fugitive) or acid blocked tertiary amine catalysts. The acid blocked tertiary amine catalysts are made by combining tertiary amine catalysts with suitable organic acids. Listed are the TDI and MDI based polyurethane foam formulations which were used to evaluate the additives using conventional acid blocked or non-blocked tertiary amine catalysts in free-rise and molded foams. In the case of flexible molded foams, the pads were removed from the heated mold and allowed to cool down to room temperature to monitor dimensional stability (shrinkage) or mechanically crushed to evaluate their physical and mechanical properties.

Example 1

Handmix experiments were conducted using the following procedure. Formulations were blended together for approximately 10 minutes using a mechanical mixer equipped with a 7.6 cm diameter high shear mixing blade, rotating at 5000 rpm. Premixed formulations were maintained at 23±1° C. using a low temperature incubator. Mondur TD-80 (an 80/20 2,4/2,6 isomer blend of toluene diisocyanate) or modified MDI was added to the premix at the correct stoichiometric amount for the reported index of each foam. The mixture was blended together with Premier Mill Corporation Series 2000, Model 89, and dispersed for approximately five seconds. The foaming mixture was transferred to an Imperial Bondware #GDR-170 paper bucket and allowed to free rise while data was recorded.

Example 2

Machine runs for the flexible molded foam were conducted on a Hi Tech Sure Shot MHR-50, cylinder displacement series and high-pressure machine. Fresh premixes, consisting of the appropriate polyols, water, crosslinker, surfactants and catalysts for each formulation were charged to the machine. Mondur TD-80 was used throughout the entire study. All chemical temperatures were held at 23±2° C. via the machine's internal temperature control units. Foam pours were made into an isothermally controlled, heated aluminum mold maintained at 63±2° C. The mold was a typical physical property tool designed with internal dimensions of 40.6 cm×40.6 cm×10.2 cm. The mold has five vents, each approximately 1.5 mm in diameter, centered in each corner 10.0 cm from each edge and the geometric center of the lid. The mold was sprayed with a solvent-based release agent, prior to every pour and allowed to dry for one minute before pouring. The foam premix was puddle poured into the center of the mold with a wet chemical charge weight capable of completely filling the mold and obtaining the desired core densities reported. Minimum fill requirements were established for each formulation evaluated. The foam article was demolded at 240 seconds (4 minutes) after the initial pour (detailed in next paragraph). Upon demold, the foam was placed through a mechanical crusher or tested for Force-to-Crush (FTC) measurements or allow to cool down to determine dimensional stability (detailed below).

Foam physical properties of each catalyst set were mechanically crushed 1 minute after demold using a Black Brothers Roller crusher set to a gap of 2.54 cm. Crushing was conducted three times on each part, rotating the foam 90 degrees after each pass through the rollers. All parts produced for physical testing were allowed to condition for at least seven days in a constant temperature and humidity room (23±2° C., 50±2% relative humidity).

FTC measurements were conducted 45 seconds after demold. The pad was removed from the mold, weighed and placed in the FTC apparatus. The force detection device is equipped with a 2.2 kg capacity pressure transducer mounted between the 323 $cm^2$ circular plate cross head and the drive shaft. The actual force is shown on a digital display. This device mimics the ASTM D-3574, Indentation Force Deflection Test and provides a numerical value of freshly demolded foam's initial hardness or softness. The pad was compressed to 50 percent of its original thickness at a cross-head velocity of 275 mm per minute with the force necessary to achieve the highest compression cycle recorded in Newton's. Ten compression cycles were completed. A cycle takes approximately 30 seconds to complete.

Example 3

Physical Properties of Flexible Polyurethane Foam Made with Fugitive Catalysts in the Presence and in the Absence of Cyanoguanidine Foam pads were prepared by adding a tertiary amine catalyst to about 302 g of a premix (prepared as in Table 2) in a 32 oz (951 ml) paper cup. The formulation was mixed for about 10 seconds at about 6,000 RPM using an overhead stirrer fitted with a 2-inch (5.1 cm) diameter stirring paddle.

The toluene diisocyanate was then added, and the formulation was mixed well for about another 6 seconds at about 6,000 RPM using the same stirrer, after which it was poured into a pre-heated mold at 70° C. and demolded after 4 minutes. The foam pads were removed from the mold, hand crushed, weighed and machine crushed at 75% pad thickness. Dimensional stability (foam shrinkage) was evaluated by allowing the foam pads to cool down and observing whether shrinkage or not took place. Foam pads were stored under constant temperature and humidity conditions for 48 hours before being cut and tested.

TABLE 2

| Premix Components | |
|---|---|
| Component | Parts by weight |
| Hyperlite E848[1] | 100 |
| Water | 3.7 |
| DABCO ® DC5164[2] | 0.10 |
| DABCO ® DC5169[3] | 0.60 |
| DABCO ® 33LX[4] | 0.30 |
| DABCO ® BL11[5] | 0.10 |

TABLE 2-continued

| Premix Components | |
|---|---|
| Component | Parts by weight |
| Diethanolamine-LF (crosslinker) | 1.04 |
| Toluene diisocyanate | To provide NCO index = 100 |

[1] High functionality capped polyether polyol of high molecular weight, functionality, and primary hydroxyl content with a base polyol molecular weight of about 5500, available from Dow Chemical Company, Midland, MI
[2,3] Silicone surfactant available from Air Products and Chemicals, Inc.
[4,5] Amine catalyst available from Air Products and Chemicals, Inc.

Table 3 shows the improvement in physical properties when cyanoguanidine is dispensed in the polyurethane formulation as a 30% solution in DMSO. The addition of 2-cyanoguaniine provides foam products with better physical properties than the current industrial standard.

TABLE 3

Dimensional Stability Results

| Component/Property | Units | Control | 1 | 2 |
|---|---|---|---|---|
| Dabco ® 33LV | PPHP | 0.30 | 0.30 | 0.30 |
| Dabco ® BL11 | PPHP | 0.10 | 0.10 | 0.10 |
| DICY | PPHP | 0 | 0.03 | 0.09 |
| TDI Index | % | 100 | 100 | 100 |
| Density | Kg/m3 | 29.68 | 29.05 | 28.58 |
| Air Flow | SCFH | 2.44 | 3.33 | 4.83 |
| ILD 25% | N | 92 | 105 | 114 |
| ILD 65% | N | 236 | 266 | 273 |
| ILD 25% Return | N | 79 | 89 | 95 |
| Tear | N/m | 212 | 237 | 308 |

Example 4

Physical Properties of Flexible Polyurethane Foam Made with Non-Fugitive Catalysts in the Presence and in the Absence of Cyanoguanidine Table 4 shows the effect of dicyanamide when used in combination with a non-emissive catalyst. The addition of dicyanamide can help improving air flows which improves foam dimensional stability. In addition other physical properties, such as ILD, tear strength and tensile strength, are also improved. Thus, better physical properties are obtained when using a combination of a non-emissive catalyst and dicyanamide when compared to emissive industry standards. Dicyanamide is dispensed in the formulation as a solution which can be obtained when dissolving dicyanamide in a mixture of POLYCAT-15 (Bis-N,N-dimethylaminopropyl amine) and water.

TABLE 4

Physical Properties

| Component/Property | Units | Fugitive Control | Non-Fugitive Control | 3 | 4 | 5 | 6 |
|---|---|---|---|---|---|---|---|
| Dabco ® 33LV | PPHP | 0.40 | — | — | — | — | — |
| Dabco ® BL11 | PPHP | 0.20 | — | — | — | — | — |
| POLYCAT ®-15 | PPHP | — | 0.85 | 0.85 | 0.85 | 0.85 | 0.85 |
| DABCO ®NE300 | PPHP | — | 0.20 | 0.20 | 0.20 | 0.20 | 0.20 |
| DICY | PPHP | — | — | 0.03 | 0.05 | 0.07 | 0.09 |
| MDI Index | % | 95 | 95 | 95 | 95 | 95 | 95 |
| Density | Kg/m3 | 48 | 48 | 48 | 47 | 49 | 49 |
| Air Flow | SCFH | 1.81 | 1.09 | 1.17 | 1.17 | 2.01 | 1.70 |
| ILD 25% | N | 296 | 285 | 303 | 324 | 327 | 353 |
| ILD 65% | N | 739 | 735 | 774 | 824 | 835 | 898 |
| ILD 25% Return | N | 222 | 215 | 228 | 242 | 241 | 261 |
| Tear | N/m | 273 | 265 | 275 | 274 | 303 | 304 |
| Tensile | kPa | 133 | 151 | 153 | 151 | 168 | 177 |
| HA-Tensile | kPa | — | 130 | 137 | 156 | — | 157 |

While the invention has been described with reference to certain aspects or embodiments, it will be understood by those skilled in the art that various changes may be made and equivalents may be substituted for elements thereof without departing from the scope of the invention. In addition, many modifications may be made to adapt the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A composition comprising: at least one polyol, at least one blowing agent, at least one catalyst, at least one surfactant, and a solution comprising dimethyl sulfoxide and at least one guanidine derivative selected from the group consisting of guanidine hydrochloride salt, guanidine phosphate salts, guanidine sulfate salts, cyano guanidine, 1-acetylguanidine, nitroguanidine, 1-(o-tolyl)-biguanidine, and mixtures thereof.

2. The composition of claim 1 wherein the catalyst comprises at least one tertiary amine.

3. The composition of claim 1 wherein the polyol comprises at least one polyether polyol.

4. The composition of claim 1 wherein the blowing agent comprises water.

5. The composition of claim 1 wherein the surfactant comprises at least one silicone surfactant.

6. A composition comprising: at least one polyether polyol, water, at least one tertiary amine catalyst, at least one silicone surfactant, at least one cross linker and a solution comprising dimethyl sulfoxide and at least one guanidine derivative selected from the group consisting of guanidine hydrochloride salt, guanidine phosphate salts, guanidine sulfate salts, and cyano guanidine.

7. The composition of claim 6 wherein the cross linker comprises at least one compound containing at least two moieties selected from hydroxyl groups, primary amino groups, secondary amino groups, and other active hydrogen-containing groups which are reactive with an isocyanate group.

8. The composition of claim 6 wherein the cross linker comprises at least one member selected from the group consisting of polyhydric alcohols, polyamines, diethyltoluenediamine, chlorodiaminobenzene, diethanolamine, diisopropanolamine, triethanolamine, tripropanolamine, and 1,6-hexanediamine.

9. The composition of claim 1 further comprising at least one polyol selected from the group consisting of graft polyols, polyurea modified polyols, and combinations thereof.

10. The composition of claim 1 wherein the guanidine derivative is present and in an amount less than about 1.0 pphp.

11. The composition of claim 9 wherein the polyol comprises the graft polyol.

12. The composition of claim 11 wherein the graft polyol comprises a homopolymer of styrene.

13. The composition of claim 11 wherein the graft polyol comprises a homopolymer of acrylonitrile.

14. The composition of claim 11 wherein the graft polyol comprises a homopolymer of styrene and a homopolymer of acrylonitrile.

15. The composition of claim 9 wherein the polyol comprises the polyurea modified polyol.

16. The composition of claim 15 wherein the polyurea modified polyol comprises a polyisocyanate polyaddition polylol.

* * * * *